Patented May 23, 1950

2,509,156

UNITED STATES PATENT OFFICE 2,509,156

DICHLOROOCTAFLUOROCYCLOHEXENE

Waldo B. Ligett, Detroit, Mich., and Earl T. McBee, La Fayette, and Vincent V. Lindgren, West Lafayette, Ind., assignors to Purdue Research Foundation, West Lafayette, Ind., a corporation of Indiana No Drawing. Application November 13, 1945, Serial No. 628,375

1 Claim. (Cl. 260—648)

This invention relates to a novel group of halocarbons constituted by the perhalocyclohexenes, specifically the chlorofluorocyclohexenes.

A preferred embodiment of our invention relates to those compounds herein claimed which have one or more —$CF_2$— groups in the cyclic structure. The presence of these —$CF_2$— groups distinguishes our invention from other members of the class of perhalocyclohexenes in that the group exerts an important characteristic stabilizing influence on the compound as a whole, in addition to being very stable in itself.

It is among the objects of this invention to provide new compounds which will be useful in the preparation of intermediates for the synthesis of fluorinated resins.

We have prepared representative members of this group of compounds and have determined certain of their physical constants whereby they may be identified. The compounds in general are colorless liquids which boil substantially above room temperature and which also possess the characteristic of water-insolubility.

The compounds may be prepared in a step-wise manner, comprising treatment of an appropriate halogenated cyclic compound, for example, hexachlorobenzene, et cetera, with bromine trifluoride as the first step in the process. The organic material from this reaction is treated with antimony pentafluoride. Subsequent dehalogenation is accomplished by means of a suitable dehalogenating agent such as zinc dust, to yield the desired chlorofluorocyclohexenes. Silver difluoride may also be employed as the fluorinating agent, utilizing a brief contact period and a mild reaction temperature, the resulting product being dehalogenated and rectified.

The invention herein is not concerned with the process of manufacture or the apparatus employed, but is concerned solely with the new group of compounds herein described and claimed. The following example illustrates one method for the preparation of the members of this new group of compounds, but is in no way to be construed as limiting the invention thereto.

The preparation of 1,2 - dichlorooctafluorocyclohexene and trichloroheptafluorocyclohexene was conducted in the following manner: Bromine trifluoride (930 grams) was placed in a nickel tube 5.2 centimeters in diameter and 50 centimeters in length, closed at one end and cooled to zero degrees centigrade. Hexachlorobenzene was added slowly to the bromine trifluoride at a rate of about 100 grams per hour with constant stirring by means of a motor-driven nickel rod inserted through the top of the nickel tube and fitted with four blades, two inches apart on the rod. After each 100-gram quantity of hexachlorobenzene had been added, the tube was heated to 90 degrees centigrade, maintained at this temperature for at least ten minutes, and then cooled to zero degrees centigrade. This prevented the accumulation and possible subsequent explosion or pyrolysis of unreacted starting materials. A total of 660 grams of hexachlorobenzene was added, representing a ratio of approximately three moles of bromine trifluoride to one mole of hexachlorobenzene. The entire reaction mixture was heated to 150 degrees centigrade overnight.

The solid product which resulted was dissolved in a fluorochloro compound in a two-liter flask and heated to 60 degrees centigrade with stirring. During three hours, 500 grams (2.3 moles) of antimony pentafluoride was added drop-wise thereto. The mixture was heated to 120 degrees centigrade and maintained at this temperature for a period of about eight hours, during which time bromine and part of the solvent were evolved from the reaction mixture. The product in solution was then washed with hot concentrated hydrochloric acid to remove antimony salts. After removal of the solvent, the solid product was dissolved in 500 milliliters of absolute ethanol.

This solution was added over a six-hour period to a refluxing suspension of 500 grams of zinc dust in ethanol. By elevation of the temperature, the more volatile products were distilled from the mixture with some alcohol. The higher boiling constituents were removed by steam distillation. Alcohol was extracted from the accumulated products by washing with water. The mixture of products was rectified in a 100-plate Podbielniak column and 1,2-dichlorooctafluorocyclohexene and trichloroheptafluorocyclohexene were separated, boiling at 112.5–113.5 and 145.5 degrees centigrade at 750 millimeters of mercury pressure absolute, respectively. Dichlorooctafluorocyclohexene, having the structural formula,

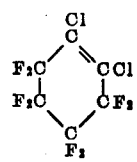

has a refractive index of 1.375 at 20 degrees centigrade, a density of 1.719 grams per milliliter at 25 degrees centigrade and a freezing point of −70 degrees centigrade. Trichloroheptafluorocyclohexene has a refractive index of 1.4013 at 20 degrees centigrade, a specific gravity of 1.774 at 25 degrees centigrade and a freezing point below —76 degrees centigrade.

We claim:

Dichlorooctafluorocyclohexene, boiling at approximately 112.5–113.5 degrees centigrade at 750 millimeters of mercury pressure, and having the following structural formula:

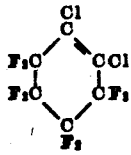

WALDO B. LIGETT.
EARL T. McBEE.
VINCENT V. LINDGREN.

REFERENCES CITED

The following references are of record in the file of this patent:

UNITED STATES PATENTS

| Number | Name | Date |
|---|---|---|
| 2,459,783 | McBee et al. | Jan. 25, 1949 |

OTHER REFERENCES

Bigelow and Pearson: "J. A. C. S." 56, 2773–4 (1934).

Van der Linden: "Recueil trav. chim. des Pays-Bas" 55, 569–76 (1936).